United States Patent [19]

Kuroyone

[11] 4,343,210

[45] Aug. 10, 1982

[54] PUNCH PRESS

[76] Inventor: Kazuo Kuroyone, c/o Anritsu Denki Kabushiki Kaisha, 12-20, Minamiazabu 4-chome, Minato-ku, Tokyo, Japan

[21] Appl. No.: 149,658

[22] Filed: May 14, 1980

[30] Foreign Application Priority Data

May 31, 1979 [JP] Japan ................. 54-66882
Jul. 31, 1979 [JP] Japan ................. 54-96675

[51] Int. Cl.$^3$ ............................. B26D 5/08
[52] U.S. Cl. ........................ 83/71; 83/552; 83/618; 83/640; 72/23; 72/442
[58] Field of Search .............. 83/71, 549, 550, 551, 83/552, 559, 618, 640, 641, 399, 400, 405; 29/33 J, 36; 72/21, 22, 23, 442

[56] References Cited

U.S. PATENT DOCUMENTS

| | | | |
|---|---|---|---|
| 2,363,208 | 11/1944 | Sulzer | 83/71 |
| 3,230,806 | 1/1966 | Rovoldt | 83/640 X |
| 3,716,716 | 2/1973 | Marantette et al. | 83/71 X |
| 3,839,937 | 10/1974 | Memain | 83/559 |
| 3,892,158 | 7/1975 | Smeets | 83/640 X |
| 4,220,062 | 9/1980 | Blanz | 83/71 |

FOREIGN PATENT DOCUMENTS 44-19839  1/1969  Japan ................. 83/559

Primary Examiner—Frank T. Yost
Assistant Examiner—Robert P. Olszewski

[57] ABSTRACT

A punch press having a punch holder and a die holder rotatably mounted on vertically spaced upper and lower plates, respectively. A punch and the corresponding die are held in the punch and die holders, respectively, for rotation therewith. The punch is cooperable with the die to machine the workpiece positioned therebetween when a predetermined angular attitude of the punch relative to the die is maintained. A detector is provided for checking whether the predetermined relation in angular attitude between the punch and the die is maintained when they are in their home positions and when they are angularly displaced from their home positions. Preferably, the upper and lower plates are arranged into upper and lower turrets rotatably holding a plurality of circumferentially spaced punch and die holders, respectively.

26 Claims, 15 Drawing Figures (i) WAVEFORM OF OUTPUT
  A1 (A2)

(ii) SPEED OF REVOLUTION OF
  MOTOR 65 (75)

(iii) WAVEFORM OF OUTPUT
  B1 (B2)

F I G. 15
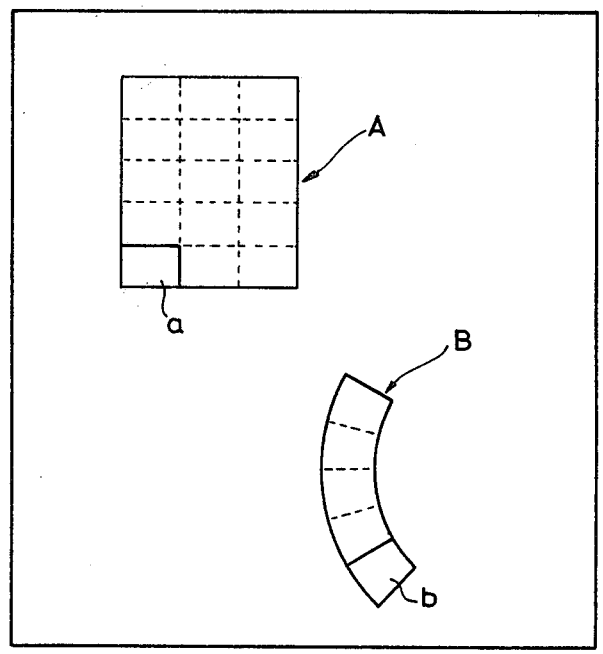

4,343,210

PUNCH PRESS

BACKGROUND OF THE INVENTION

1. Field of the Invention

This invention relates to a punch press, and more particularly to a numerically controlled punch press having rotatable punch and die holders respectively accommodating a punch and the corresponding die, the punch being maintained at a predetermined angular attitude relative to the die throughout the punching operation.

2. Description of the Prior Art

In an NC punch press, a workpiece to be worked is set in a punching position according to programmed control and is subjected to the punching or shearing operation by a punch tool.

With a conventional NC punch press, a rectangular shape such as shown at A of FIG. 15 can be effectively cut out using a pair of punch and die of the shapes as shown at a while positioning the workpiece in both the X and Y axes. However, it is impossible to cut out such a part of an annular shape as shown at B with only a pair of punch and die of the shapes as shown at b. Thus, it is necessary to replace one tool with another merely for the purpose of changing angular attitude thereof. Such replacement is time-consuming and spoils the important feature of the NC punch press that it is capable of 100 to 500 times of punching operations in one minute. A turret punch press can improve the problem in the machining time to some extent, but it can mount only a limited number of punch tools so that it is difficult to obtain a smooth curved cut line.

BRIEF SUMMARY OF THE INVENTION

It is, therefore, an object of the present invention to provide a punch press in which the above-mentioned difficulty of the conventional NC press machines is overcome.

Another object of this invention is to provide a numerically controlled punch press capable of cutting out the worksheet with a smooth curved cut line at a high speed.

A further object of this invention is to provide a numerically controlled punch press in which a punch holder for holding a punch and a die holder for holding the corresponding die are rotatably mounted on upper and lower plates, respectively.

A further object of this invention is to provide a numerically controlled punch press which starts machining operation after confirming that a predetermined relation in angular attitude between the punch and die is established when they are set at their home positions and/or when they are angularly displaced therefrom.

A further object of this invention is to provide a numerically controlled turret punch press in which each pair of punch and die holders are rotatably mounted on the turrets.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIG. 15 is a diagrammatic plan view of a worksheet illustrated for the explanation of punching operations.

DESCRIPTION OF THE PREFERRED EMBODIMENTS

Figure 1:
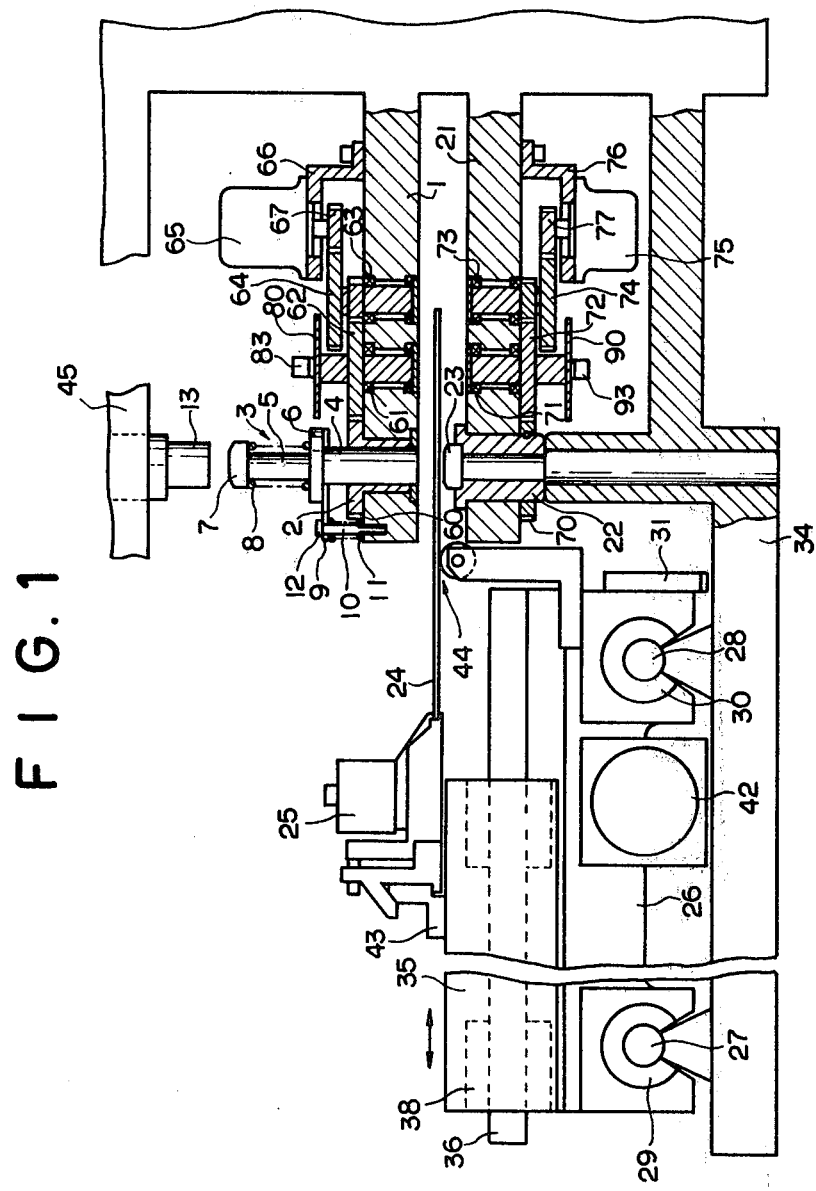
FIG. 1 is a fragmentary elevational view, partly in cross-section, diagrammatically showing an essential part of a punch press according to the present invention.

Referring to the accompanying drawings and first to FIG. 1, the punch press is provided with a pair of vertically spaced apart upper and lower support plates 1 and 21 which are secured to upper and lower bases 45 and 34, respectively. The upper support plate 1 is provided with a bore for rotatably receiving a punch holder 2. The punch holder 2 has a through-hole coaxial with its rotational axis to receive a punch means which is generally indicated at 3.

The punch means 3 has a cylindrical guide 4 axially slidably received in the through-hole of the holder 2 and a punch 5 axially slidably received in the through-hole of the guide 4. A spring 8 is mounted between a flanged upper end 6 of the guide 4 and a head portion 7 of the punch 5. When the punch means 3 is not in operation, the guide 4 is retained in a predetermined retracted position (as illustrated in FIG. 1) by a support member 9 which is constantly urged upward by springs 11 which are loaded on a number of pins 10. The pins 10 are plated on the upper support plate 1 and provided with stoppers 12 at the respective upper ends to limit upward movement of the support member 9. A punch striker means such as a hammer 13 is provided overhead the punch 5.

A die holder 22 is rotatably mounted on the lower support plate 21 at a position opposing the lower end of the punch holder 2 on the upper support plate 1. The die holder 22 has a throughhole formed coaxially with its rotational axis to receive a die 23.

Upon actuating the hammer 13 to press the head 7 of the punch 5, the guide 4 is lowered against the action of the spring 11 since the force of the spring 8 is greater than the total force of the springs 11. The lower end face of the guide 4 is then brought into contact with a workpiece 24, which is positioned between the punch 5 and the die 23, to press it against the die 23. By further pressing operation of the hammer 13, the punch 5 is lowered against the force of the spring 8 to perform the punching operation on the workpiece 24. As the hammer 13 is moved upward, the punch 5 begins to move upward by the action of the spring 8 and then the guide 4 moves upward by the action of the spring 11, disengaging from the workpiece 24 and returning to the initial retracted position.

Figure 2:
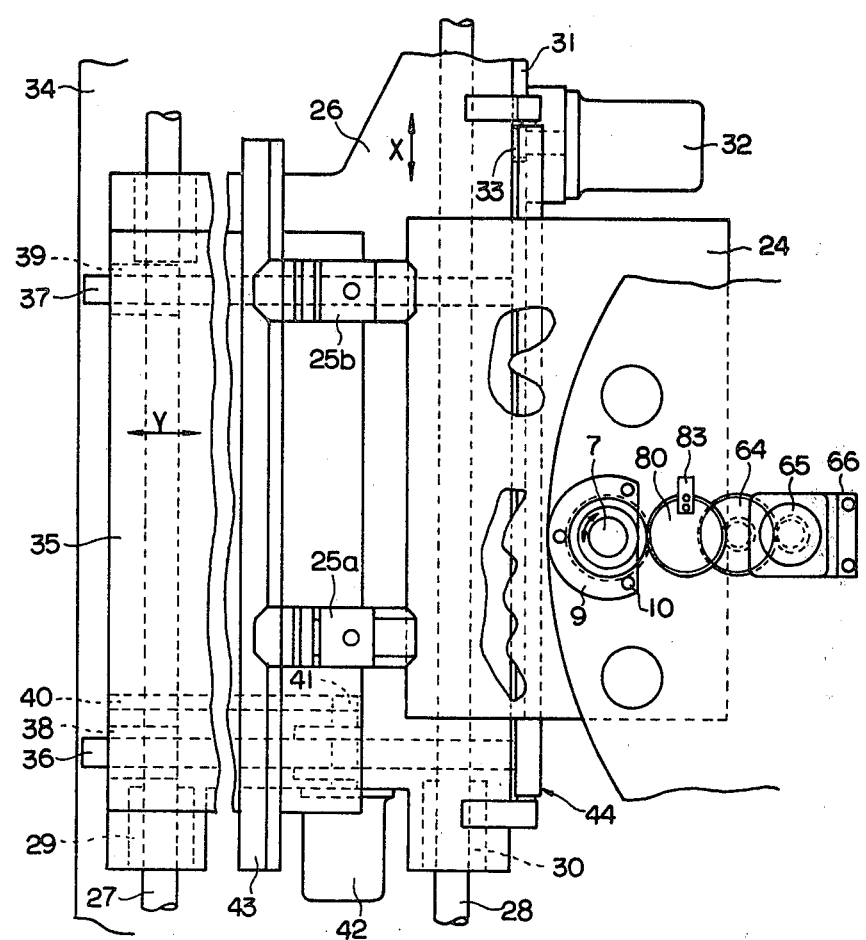
FIG. 2 is a fragmentary plan view of FIG. 1.

The workpiece 24 is held, as shown in FIG. 2, by clampers 25a and 25b and is displaced preferably in both the X and Y axes. Designated at 26 is a movable table which is mounted on a pair of laterally spaced parallel guide ways 27 and 28 through linear bearing members 29 and 30 for movement along the X axis, namely, along the axes of the guideways 27 and 28. Indicated at 31 is a rack which is mounted on the table 26 for meshing engagement with a pinion gear 33 of an NC motor 32 which is fixed on the lower base 34. Thus, the table 26 is driven from the motor 32 to move along the X axis.

A movable table 35 is mounted on the movable table 26 for movement therewith. A pair of parallel guideways 36 and 37 are fixed on the table 26 to extend perpendicular to the guideways 27 and 28 and to support thereon the above-mentioned table 35 through linear bearings 38 and 39. The reference numeral 40 denotes a rack which is fixedly mounted on the table 35 for meshing engagement with a pinion 41 of an NC motor 42 which is fixedly mounted on the table 26. Thus, the table 35 is driven from the motor 42 to move along the Y axis, that is to say, perpendicular to the direction of movement of the table 26.

The clampers 25a and 25b for holding the workpiece 24 in position are slidably mounted and fixed in suitable positions on a rail 43 which is in turn fixed on the table 35. Indicated at 44 is a disengaging mechanism having an elongated roller hinged to the table 26 for pivotal movement and adapted to be engaged by the underside of the workpiece 24 for disengaging it from the die 23. The roller is moved by a motor, not shown.

The motors 32 and 42 are respectively driven according to the commands fed from an NC unit to set the workpiece 24 at a desired position, actuating the hammer 13 by a punch command from the NC unit to work the workpiece in cooperation with the punch 5 and die 23. In FIG. 1, the upper and lower plates 1 and 21 which respectively support the punch and die holders 2 and 22 are shown as being fixed to the upper and lower bases 45 and 34. However, if desired, they may be provided in the form of upper and lower turrets which are rotatably mounted on the upper and lower bases, respectively, each equipped with a plural number of tools at spaced positions around the circumference thereof.

In the thus constructed punch press of the invention, the working range of the press is widened since the punch and die holders 2 and 22 can be set in arbitrary angular attitudes. The punch and die holders 2 and 22 are rotated by the following drive means. The punch holder 2 has a gear 60 formed on its outer periphery and meshed with an intermediate gear 62 which is rotatably held in the upper plate 1 through a bearing 61 and which is rotatable in synchronism with the punch holder 2. The intermediate gear 62 is meshed with a reduction gear 64 which is rotatably held in the upper plate 1 through a bearing 63. A numerically controlled bi-directional motor 65, for example, a servomotor is fixedly mounted on the upper plate 1 by a bracket 66 and has its drive gear 67 meshed with the reduction gear 64.

Similarly, the die holder 22 has a gear 70 formed on its outer periphery for meshing engagement with an intermediate gear 72 which is rotatable in synchronism with the die holder 22. The intermediate gear 72 is meshed with a reduction gear 74 which is in engagement with a drive gear 77 of an NC motor 75. Indicated at 71 and 73 are bearings and at 76 a bracket for mounting the motor 75.

Thus, by rotation of the NC motors 65 and 75, the punch and die holders 2 and 22 are rotated, together with the punch 5 and die 23, in either direction with their respective axes as the centers of rotation. In this connection, it is important that the punch and die, mounted respectively in the punch and die holders for rotation therewith, should be maintained in a predetermined angular attitude with each other during the operation since otherwise the punch would not fit into the die, resulting in breakdown of the punch and die and, of course, of the machine itself. The present invention provides a punch press in which the punching operation programmed in the NC unit is started only when the punch is in a predetermined angular attitude relative to the die.

Figure 3:
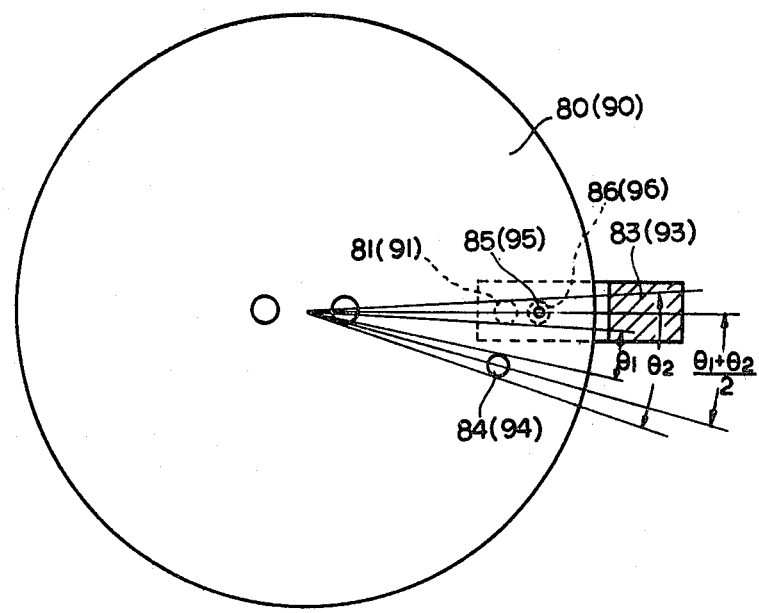
FIG. 3 is an enlarged plan view, partly in cross-section, diagrammatically showing a detection means used in the punch press of FIG. 1, taken along the line III—III of FIG. 4.
Figure 4:
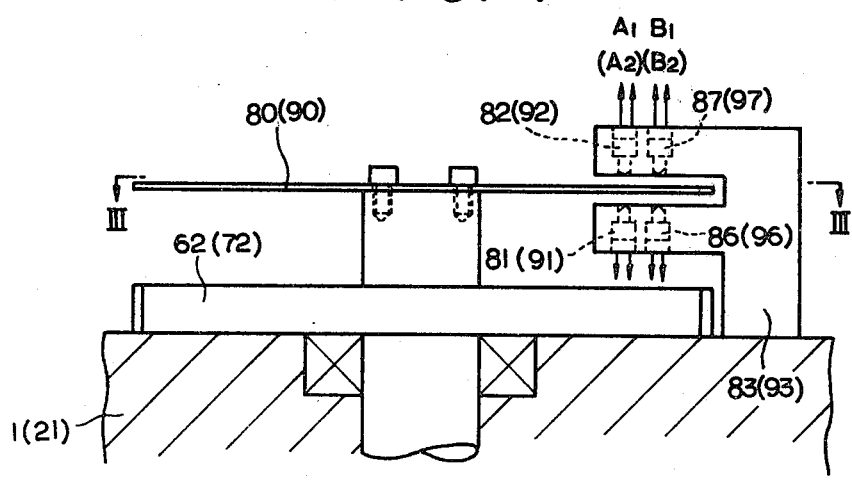
FIG. 4 is an elevational view of FIG. 3, partly in cross-section.

Referring to FIGS. 3 and 4, a disc 80 is mounted on the intermediate gear 62 and is rotatable in synchronism with the punch holder 2, making a full turn per revolution of the punch holder 2. A light emitting means, preferably a light emitting diode 81, and a light responsive means, preferably a phototransistor 82, are mounted opposingly on arms of a mounting block 83 extending on opposite sides of the disc 80 such that the light emitted from the light emitting diode 81 is detected by the phototransistor 82. The disc 80 is provided with a light permeable portion, preferably an aperture 84.

The aperture 84 draws a predetermined locus upon rotation of the disc 80, across the passage of light from the diode 81. Therefore, as the disc 80 is rotated by rotation of the motor 65 driven from a home position setting circuit which is not shown, light from the diode 81 is projected on the transistor 82 through the aperture 84 when the aperture 84 aligns with the diode 81 and phototransistor 82. At this time, the phototransistor 82 produces an output signal $A_1$ as shown at (i) of FIG. 5. The motor 65 starts to be decelerated at the uprising edge of the output signal and stops after rotation through an angle of $\theta_1$ from the downgoing edge of the output signal, as shown at (ii) of FIG. 5. That is to say, the disc 80 rotates through an angle of $\theta_2$ while the motor starts deceleration and stops. In other words, after the hole 84 is positioned between the diode 81 and the transistor 82, the disc 80 is rotated through an angle of $\theta_2$ before it is stopped. The punch holder 2 which is rotatable in synchronism with the disc 80 is now returned to its initial or home position (FIG. 4).

A detecting means is provided in order to check whether or not the punch holder 2 is actually returned to its home position upon the home setting operation.

More particularly, a first check point is provided in an arbitrary fixed position on the punch holder 2, which draws a certain predetermined locus by rotation of the punch holder 2. The position on the locus at which the check point is located when the punch holder 2 is actually in the home position is determined as an original position (a first location) of the check point. In order to detect whether or not the check point is in the original position, the disc 80 is provided with a light permeable check portion, preferably an aperture 85 which, when the check point of the punch holder 2 is in the original position, allows light from light emitting means, preferably a light emitting diode 86, to pass therethrough into a light responsive means, preferably a phototransistor 87. The diode 80 and the transistor 87 are located in positions below and above the disc 80, respectively.

In the embodiment shown, the diode 86 and transistor 87 are mounted on the arms of the mounting block 83, the diodes 81 and 86 and transistors 82 and 87 being aligned in the radial direction of the disc 80. Therefore, the home setting aperture 84 and the check aperture 85 are spaced from the rotational center of the disc by the angle $\frac{1}{2}(\theta_1+\theta_2)$, as shown in FIG. 3. This arrangement is preferable for reasons of easy fabrication and simple construction. However, the check aperture 85 can be provided at any arbitrary position on the disc 80 unless it is located on the locus of the aperture 84. The position of the diode 86 and transistor 87 is determined, accordingly. Further, the detecting means including the aperture 85 may be formed in the punch holder 2 instead of the disc 80. As clear from the foregoing description, in the initial setting operation by the home setting circuit, the transistor 87 senses and produces an output signal $B_1$ as indicated at (iii) of FIG. 5 when the check point of the punch holder 2 is located in the original position, namely, when the punch holder is actually returned to its home position.

Figure 5:
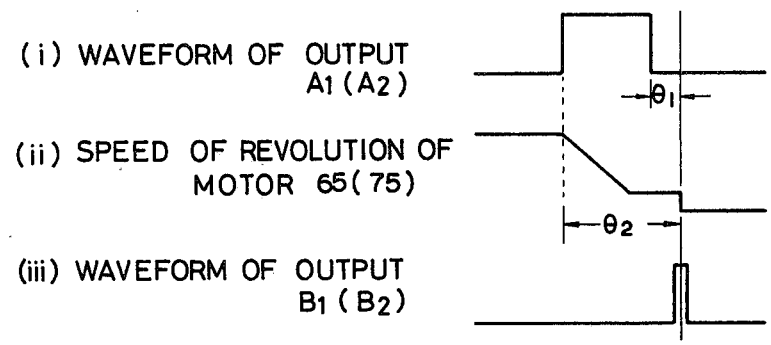
FIG. 5 is a schematic diagram showing the relationship between waveforms of the output from the detection means of FIG. 4 and the velocity of revolution of a motor.

A similar home setting and checking mechanism is also provided on the part of the die holder 22. In FIGS. 3, 4 and 5, the elements designated as parenthesized reference numerals 90 to 97 correspond to and are the same as the above-described elements 80 to 87, respectively, both in features and functions. A detection signal $B_2$ is produced when a second check point of the die holder 22 is positioned at its original point (a second location), namely when the die holder 22 is actually returned to its home position.

When the punch and die holders 2 and 22 are located at their home positions, the therein retained punch 5 and die 23 are cooperable with each other to machine the workpiece. Of course, even when the punch and die holders 2 and 22 are angularly displaced from their home positions, the punch 5 and die 23 are cooperable with each other so far as such a relationship, in angular attitude, between the punch holder 2 and die holder 22 as they have when they are in their home positions is kept unchanged, i.e. so far as angular displacements of the first and the second check points from their respective original positions are equal.

Figure 6:
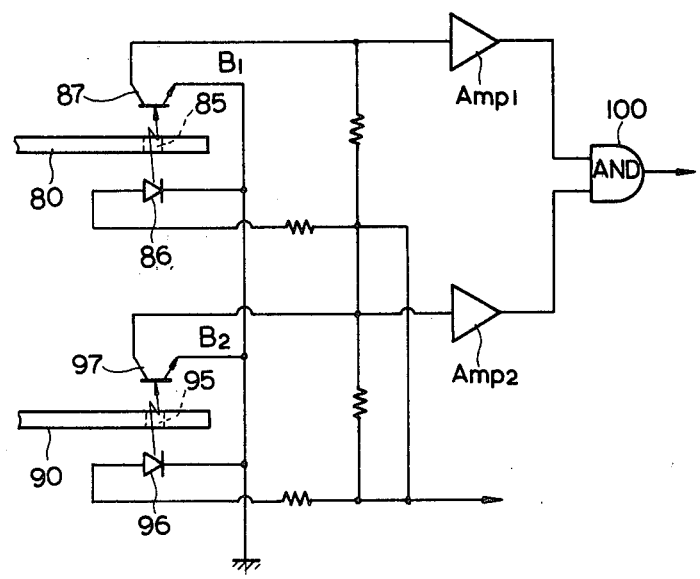
FIG. 6 is a schematic circuit diagram of the detection means of FIG. 4.

In order to check whether or not both the punch holder 2 and die holder 22 are returned to the respective original positions, the transistors 87 and 97 are coupled, as shown in FIG. 6, to an AND gate 100 through amplifiers $Amp_1$ and $Amp_2$, the output of which is conducted to a starter of the NC unit which will be described hereinlater. On home setting operation, if both or either one of the punch holder 2 and die holder 22 is not returned in the home position, namely, when both or either one of the detection signals $B_1$ and $B_2$ is absent, the NC unit does not start since the AND gate 100 produces no start signal. That is to say, the NC unit starts only when both detection signals $B_1$ and $B_2$ are produced simultaneously.

Once the punch holder 2 and die holder 22 are set in the respective home positions, the punch and die are capable of performing the machining operation as long as they are rotated in the same amounts.

Figure 7:
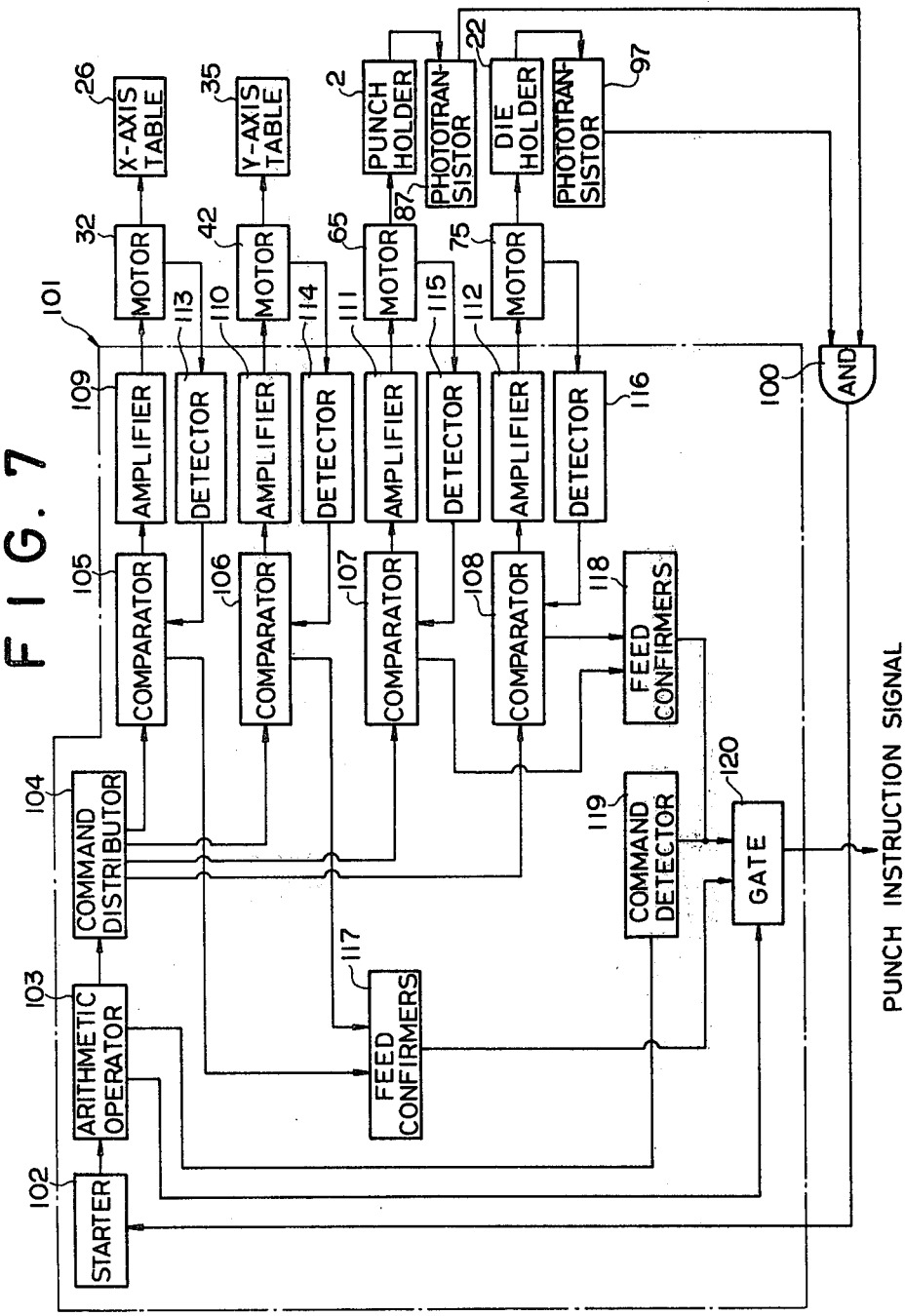
FIG. 7 is a block diagram used in the punch press of FIG. 1.

The operation by NC control is effected according to a block diagram of FIG. 7, in which indicated at 101 is an NC unit which includes a starter 102, an arithmetic operator 103, a command distributor 104, comparators 105 to 108, amplifiers 109 to 112, detectors 113 to 116, feed confirmers 117 and 118, a zero command detector 119, and a gate 120.

If a start signal is produced at the output terminal of the AND gate 100 as described hereinbefore, this is fed to the starter 102 to start the NC unit 101. Instructions from the arithmetic operator 103 are read out by the command distributor 104 which distributes the commands to the respective parts. For example, for the X-axis feed table 26 of FIGS. 1 and 2, the NC motor 32 is started by the command, and the degree of rotation is detected by the detector 113, while the comparator 105 comparing its input and the output from the detector 113 to stop the X-axis feed table 26 when the difference between the input and output is zero. The Y-axis feed table 35 is moved in a similar manner and, upon completing the movements of the two tables, the feed confirmer 117 produces a confirmation signal. Likewise, the punch holder 2 and die holder 22 are driven separately according to the instructions from the distributor 104 and they are rotated in the same degrees as long as there are no errors in the commands. Upon completing rotations of the punch and die holders 2 and 22, the confirmer 118 produces a confirmation signal. When all the commands are fed out of the arithmetic operator 103, this is confirmed by the zero command detector 119 to open the gate 120, whereupon the arithmetic operator 103 produces a punch instruction signal to actuate the hammer 13 against the punch means 3 thereby machining the workpiece 24.

If necessary, after each series of the punching operations, the punch and die holders 2 and 22 are set in their home positions by programmed numerical instructions before initiating the next series of operation. Therefore, errors in the home setting by the NC unit or in the operations by the drive mechanisms for the punch and die holders can be detected.

In this manner, the angular orientations of the punch holder and the die holder are changed by the programmed control while checking from time to time their relative attitudes. This coupled with the control of the X- and Y-axis tables 26 and 35, allows a punching operation of a given shape at a high speed of 500 cycles per minute.

As described hereinbefore, the NC unit initiates its operation after the punch and die holders 2 and 22 are returned to the respective home positions. However, if the punch and die holders are angularly displaced in different degrees, the relative angular attitude of the punch and the die is changed, unabling to perform the punching operation.

According to another embodiment of the present invention, the NC punch press machine is provided with means for measuring angular displacements of the punch and die holders in each rotation or a predetermined series of rotation and means for allowing the punching operation only when the punch and die holders are rotated in the same degrees maintaining a predetermined relationship in angular attitude therebetween.

Figure 8:
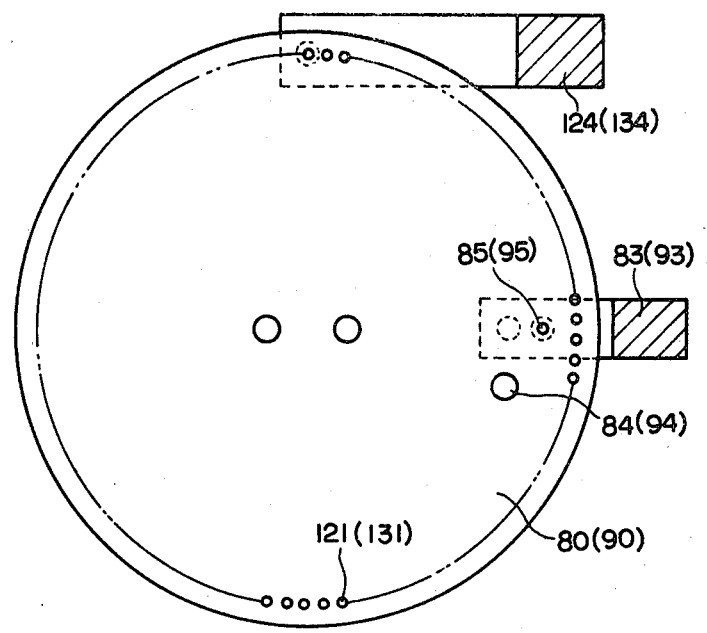
FIG. 8 is an enlarged plan view, similar to FIG. 3, diagrammatically showing, in addition to the detection means, means for measuring degrees of rotation of the punch and die holders, taken along the line VIII—VIII of FIG. 9.
Figure 9:
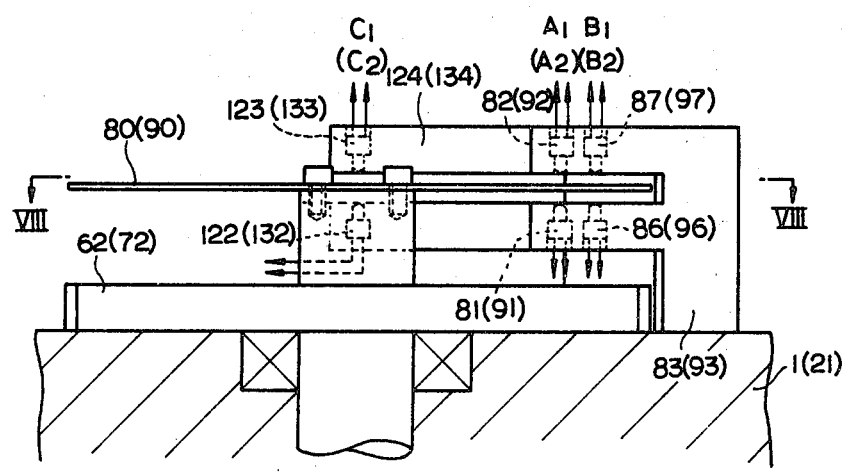
FIG. 9 is an elevational view of FIG. 8, partly in cross-section.
Figure 10:
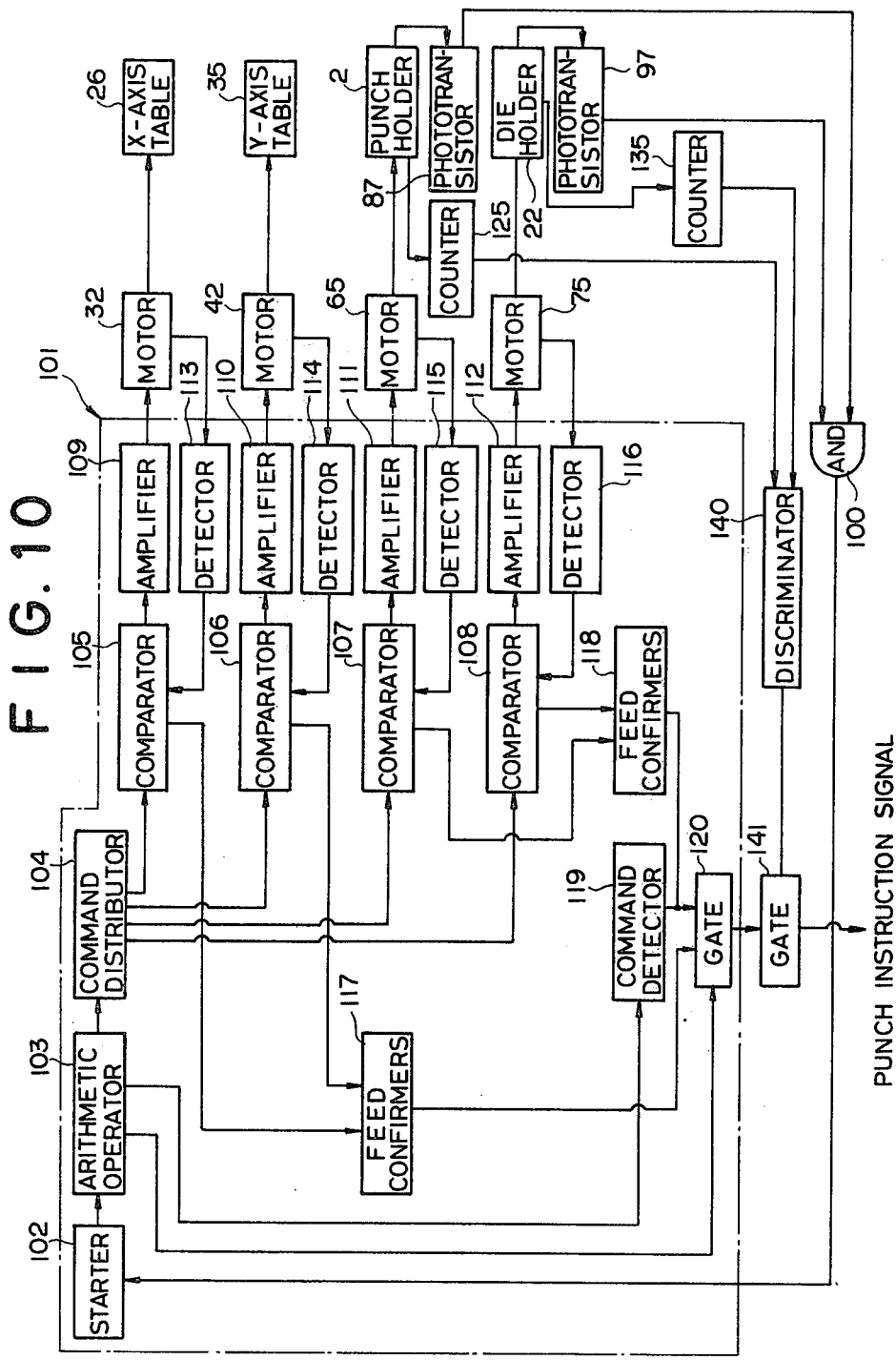
FIG. 10 is a block diagram, similar to FIG. 7, used in the embodiment of FIGS. 8 and 9.

FIGS. 8 to 10 show a punch press machine which is provided with such means and in which like parts are designated by like reference numerals. In FIGS. 8 and 9, the disc 80 fixed on the intermediate gear 62, is provided with a multiplicity of angularly equally spaced holes 121 which are arranged in a circle coaxial with the disc 80. A pair of light emitting means, preferably a light emitting diode 122 and a light responsive means, preferably a phototransistor 123, are located on opposite sides of the disc 80 such that light emitted from the diode 122 is received by the phototransistor 123 through one of the holes 121. In the embodiment shown, the diode 122 and transistor 123 are provided on a mounting block 124 which is fixed on the upper support plate 1. If desired, the diode 122 and phototransistor 123 may be located on the mounting block 83.

The motor 65 and thus the disc 80 is rotated by a command from the NC unit 101, whereupon the transistor 123 produces pulses $C_1$ in a number corresponding to the number of holes 121 which pass across the passage of light from the light emitting diode 122, namely, corresponding to a degree of the angular displacement of the disc 80 (viz., the angular displacement of the punch holder 2).

A mechanism comprised of elements 131 to 134 similar to the above-mentioned elements 121 to 124, respectively, is provided on the lower plate 21. Thus, as the motor 75 is rotated by a command of the NC unit 101, the phototransistor 133 produces pulses $C_2$ in a number corresponding to a degree of the angular displacement of the die holder 22.

Referring to FIG. 10, the output pulses $C_1$ and $C_2$ are fed to counters 125 and 135, respectively, for counting the numbers of pulses produced by the phototransistors 123 and 133, which indicate the degrees of angular displacements of the punch and die holders 2 and 22. If desired, the counters 125 and 135 may be reset by the output of the AND gate 100 every time the punch and die holders 2 and 22 are returned to their home positions.

The counters 125 and 135 are coupled to a suitable means, for example a comparator 140, for discriminating whether the degrees of rotations of the punch and die holders 2 and 22 are equivalent. The discriminating means 140 compares the counts of the counters 125 and 135 and produces a punch allowance signal when the difference between the two counts is zero, the allowance signal being conducted to a gate 141 to open same. A punch instruction signal from NC unit 101 is fed to the gate 141 through the gate 120 to drive the hammer 13 to effect the desired punch work. In the event the degrees of angular displacements of the punch and die holders 2 and 22 are not equivalent, the discriminating means 140 produces no output signal so that the gate 141 remains closed, preventing the punch instruction signal from the NC unit 101 from being fed to the hammer 13.

In measuring the angular displacements of the punch and die holders by counting the numbers of pulses in the above-described manner, it is preferred that the holes 121 be provided in as great a number as possible in order to minimize the error of measurement.

For judging whether the degrees of rotations of the two holders 2 and 22 are the same, each hole 121 may be formed of marks in combinations indicative of absolute addresses. In such a case, as the discriminating means 140 means for judging whether or not stop positions of the holders have the same addresses is used.

By providing the angular displacement measuring means as described above, it becomes possible to check the angular attitude of the punch and die throughout the punch work, ensuring safe high-speed operations. Especially in a case where it is combined with the above-described home setting check mechanism, the check of the angular attitude of the punch relative to the die becomes more perfect.

As mentioned previously, the upper and lower support plates 1 and 21 can be used as upper and lower turrets. In such a case, the home setting check mechanism and/or angular displacement measuring mechanism are provided for each pair of a plural number of punch and die arranged on the turrets. It is possible in principles but impractical to provide a drive means and a NC unit for each pair of the holders.

Figure 11:
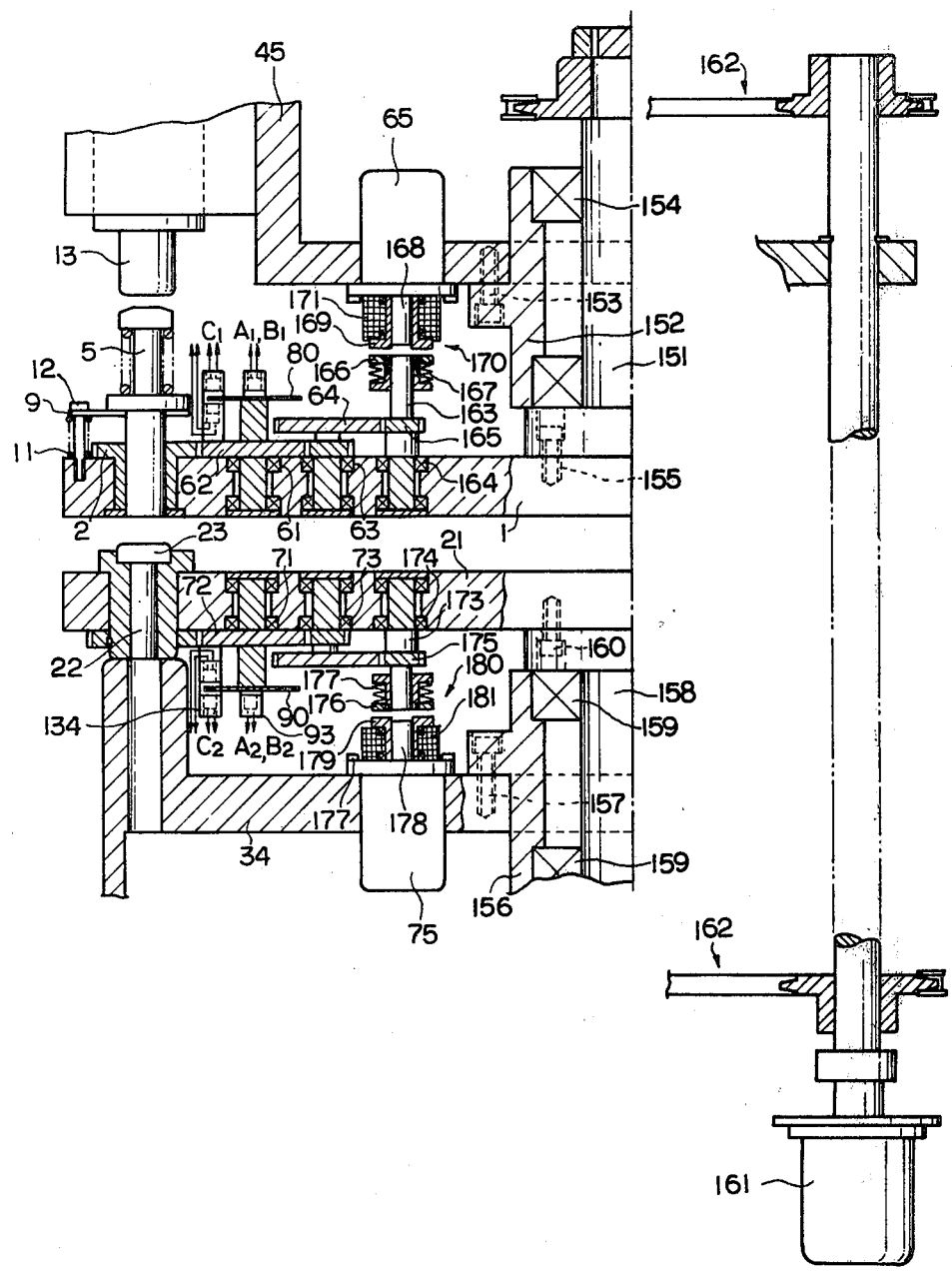
FIG. 11 is a fragmentary elevational view, partly in cross-section, diagrammatically showing a turret punch press of the present invention, taken along the line XI—XI of FIG. 12.

The following example shows the home setting check and angular displacement measuring mechanisms as applied to a turret punch press. Referring to FIG. 11, designated as 151 is a shaft which is rotatably received through a bearing 154 in a sleeve 152 fixed on an upper base 45 by a screw 153. An upper plate 1 which serves as an upper turret is fixed on the shaft 151 by a screw 155. Similarly a sleeve 156 is fixed by a screw 157 on a lower base 34, rotatably receiving therein a shaft 158 through a bearing 159. A lower plate 21 which serves as a lower turret is fixed on the shaft 158 by a screw 160. The shafts 151 and 158 are rotated by a sprocket and chain rotary drive means 162 driven from a motor 161.

Figure 12:
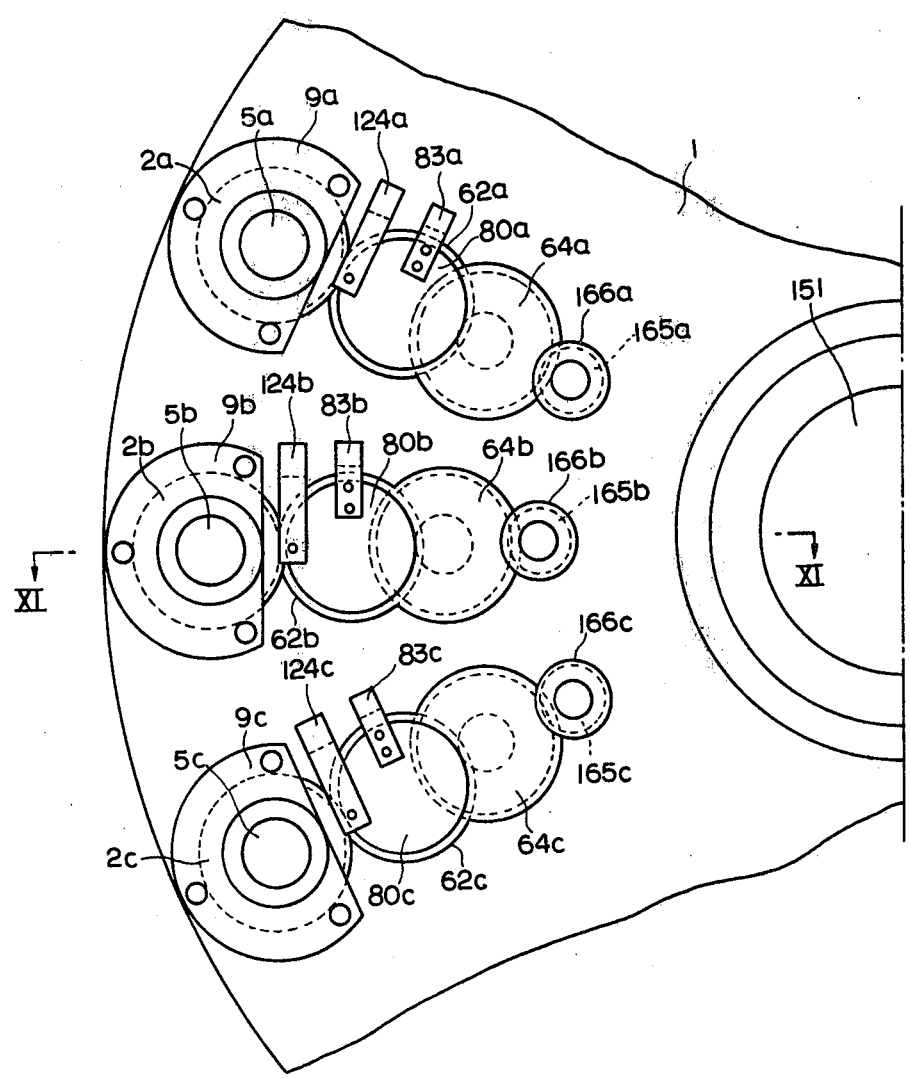
FIG. 12 is a fragmentary plan view diagrammatically showing an upper turret of FIG. 11.

As shown in FIG. 12, the upper turret 1 holds a plurality of circumferencially spaced punch holders 2a, 2b, 2c and so on accommodating a punch 5a, 5b or 5c, respectively, as described hereinbefore with reference to FIG. 1. Similarly, the lower turret 21 holds the corresponding dies 23a, 23b, 23c and so on accommodated in die holders 22a, 22b, 22c and so on. These turrets 1 and 21 are rotated to position a tool, i.e. a pair of punch and die, at the desired punching location by the drive means 162.

Each punch holder, when positioned at the punching location, is rotated by a common NC motor 65 fixed on the upper base 45. Referring again to FIG. 11, the reference numeral 163 denotes a drive shaft which has one end thereof rotatably supported on the upper turret 1 through a bearing 164. A gear 165 is fixedly mounted on the shaft 163 and is meshed with a reduction gear 64. Attached to the other end of the shaft 163 is a driven friction disc 166 of a clutch 170. Attached to the fore end of an output shaft 168 of the motor 65 is a common drive friction disc 169, constituting the clutch 170 in cooperation with the driven friction disc 166. Preferably, the clutch 170 is of an electromagnetic type having an armature which serves to function as the driven friction disc 166. The armature 166 is slidably secured to the shaft 163 but is inhibited to rotate thereabout. When a field coil 171 is energized, the armature 166 is moved upward to engage the drive friction disc 169 for rotation therewith. Upon de-energizing the field coil 171, the armature is disengaged from the disc 169 and is returned to the original position by the action of a spring 167.

Thus, as the motor 161 is actuated according to the NC program, the upper turret 1 is rotated to position a selected one of the punch holders, e.g. the holder 2a, in the punching location, whereby bringing the armature 166a into a position confronting the common drive friction disc 169. The clutch 170 is then actuated by a command from the NC program to couple the selected armature 166a with the common disc 169. As the motor 65 is actuated by a command from the NC programmer, the rotational power of the motor shaft 168 is transmitted successively through the clutch 170, drive gear 165a, reduction gear 64a, intermediate gear 62a and punch holder 2a to rotate the punch 5a into a desired angular attitude.

The lower turret 21 and base 34 are also provided with a similar drive mechanism for the die holders, i.e. in FIG. 11, the elements designated as 173 to 181 correspond to and are the same as the afore-mentioned elements 163 to 171, respectively, in both features and functions.

The thus constructed turret punch press is provided with the previously described home setting check mechanism and/or angular displacement measuring mechanism for the punch and die holders whereby the press machine has increased machining abilities and is capable of various punching operations. For example, a turret punch press provided with both the home setting check mechanism and angular displacement measuring mechanism is operated as follows. For start up, a manual remote control is performed to position a desired pair of punch and die at the punching location. Then a home setting circuit (not shown) is operated to actuate the field coils 171 and 181 and to actuate the motors 65 and 75 so as to return the punch and die holders 2 and 22 to their home positions. If these holders are actually returned to their home positions, an AND gate 100 (FIG. 13) generate an output which is conducted to a starter 102, allowing a control unit 191 to start its operation.

Figure 13:
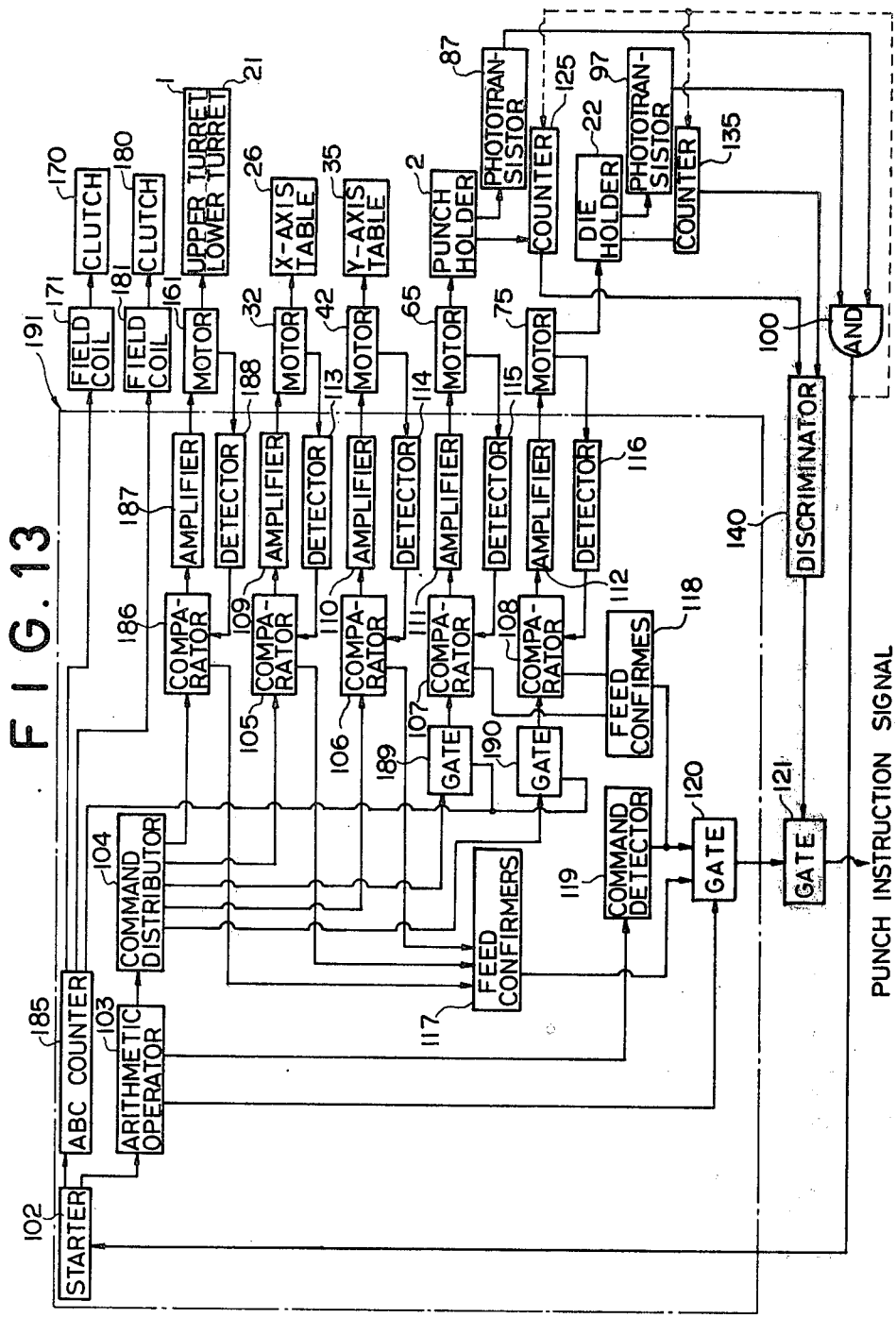
FIG. 13 is a block diagram used in the turret punch press of FIG. 11.

FIG. 13 shows a block diagram of control sequence for the turret punch press of the foregoing embodiment, in which indicated at 185 is an ABC counter, at 186 a comparator, at 187 an amplifier, at 188 a detector, and at 189 and 190 gates. The functions of the respective parts of the NC unit 191 are well known in the art and thus explanations in this regard are omitted herein. Once the control unit is actuated, the home checking mechanism may be operated according to programed control, for example each time the turrets are rotated to position different tool at the punching location. The operation of the angular displacement measuring mechanism is as described previously.

Figure 14:
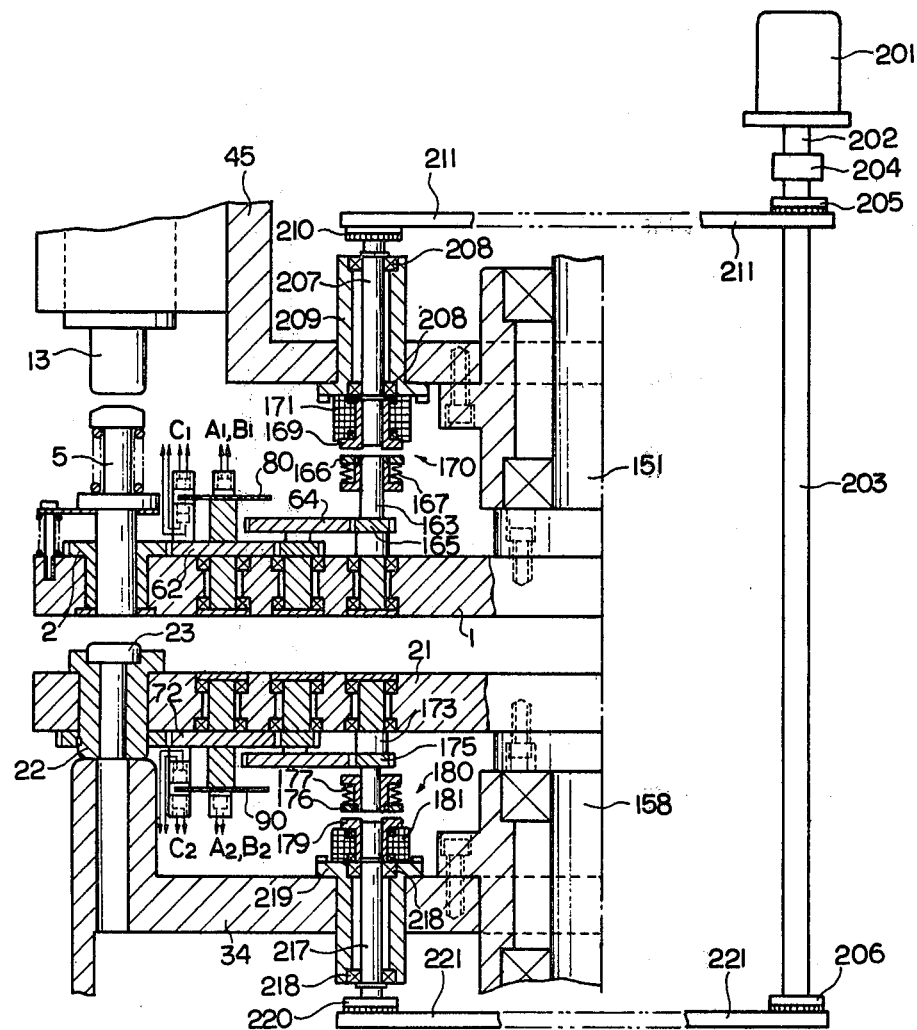
FIG. 14 is an elevational view, similar to FIG. 11, showing a modification employing a common drive motor for the punch and die holders.

The punch and die holders 2 and 22 are shown as being driven separately from motors 65 and 75 in FIGS. 1 and 11. However, they may be driven from a single NC motor using a sprocket and rotary chain drive. FIG. 14 shows such an embodiment adopted to the punch press of FIG. 11. In FIG. 14, an output shaft 202 of a common NC motor 201 is connected to a transmission shaft 203 through a coupler 204. The transmission shaft 203 has sprockets 205 and 206 at the upper and lower ends thereof. A sleeve 209 is fixed on the upper base 45 to rotatably hold a rotational shaft 207 through a bearing 208. The previously described common drive friction disc 169 of the clutch 170 is secured to the lower end of the rotational shaft 207, which supports a sprocket 210 at the upper end thereof. A chain 211 is put around the sprocket wheels 205 and 210.

Similarly, a sleeve 219 is fixed on the lower base 34 to support through a bearing 218 a rotational shaft 217 which has the drive friction disc 179 of the clutch 180 at one end and a sprocket wheel 220 at the other end thereof. A transmission chain 221 is stringed around the sprocket wheels 206 and 220.

With the above-described arrangement, as the motor 201 is started by the NC program, the driving force of the transmission shaft 203 is transmitted through the upper and lower chains 211 and 221 to the rotational shaft 207 and 217 to rotate the drive friction discs 169 and 179. At this time, if the clutches 170 and 180 are in energized state, the punch and die holders 2 and 22 are rotated with the punch 5 and die 23. Simultaneously, the discs 80 and 90 are rotated in synchronism with the holders to check the settings in the home positions and/or to measure degrees of rotations.

In the foregoing embodiments, the X and Y-axes tables 26 and 35, the punch and die holders 2 and 22, the upper and lower turrets 1 and 21, the clutches 170 and 180, the hammer 13 and etc. have been described as being operated by programmed control. But they can be operated by manual remote control in which an operator is manually actuating the controls from a remote console. The invention is best utilized in the fully computerized automatic mode however.

The invention may be embodied in other specific forms without departing from the spirit or essential characteristics thereof. The present embodiment are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. A punch press, comprising:
   a base member;
   a pair of vertically spaced apart upper and lower plates secured to said base member;
   a punch holder rotatably mounted on said upper plate for supporting a punch and having a first check point at a fixed position thereof so that said first check point draws a predetermined first locus by rotation of said punch holder;
   a die holder rotatably mounted on said lower plate for supporting a die and having a second check point at a fixed position thereof so that said second check point draws a predetermined second locus by rotation of said die holder;
   drive means for rotating said punch holder and said die holder;
   first detection means adapted to produce a first detection signal when said first check point is positioned at a predetermined first location on said first locus;
   second detection means adapted to produce a second detection signal when said second check point is positioned at a predetermined second location on said second locus;
   said punch and die being cooperable with each other to machine a workpiece interposed therebetween when said first and second check points are positioned respectively at said first and second locations or when an angular displacement of said first check point from said first location is the same as that of said second check point from said second location;
   means for positioning the workpiece in the X axis and/or Y axis;
   means supplied with said first and second detection signals and adapted to produce a start signal upon receipt of both of said first and second detection signals;

a control unit adapted to start operation upon receipt of said start signal and to generate a punch instruction signal; and means for actuating said punch relative to said die upon receipt of said punch instruction signal, whereby to machine the workpiece.

2. A punch press as set forth in claim 1, wherein said first detection means comprises:

a first disc rotatable in synchronism with said punch holder;

a pair of first light emitting means and first light responsive means located opposingly on opposite sides of said first disc such that light emitted from said first light emitting means is projected toward said first light responsive means; and a first light permeable portion formed in said first disc at a position crossing the light passage of said first light emitting means during rotation of said first disc, said first light responsive means being adapted for receiving light emitted from said first light emitting means and producing said first detection signal only when said first light permeable portion is positioned in said light passage of said first light emitting means; and said second detection means comprises:

a second disc rotatable in synchronism with said die holder;

a pair of second light emitting means and second light responsive means located opposingly on opposite sides of said second disc such that light emitted from said second light emitting means is projected toward said second light responsive means; and a second light permeable portion formed in said second disc at a position crossing the light passage of said second emitting means during rotation of said second disc, said second light responsive means being adapted for receiving light emitted from said second light emitting means and producing said second detection signal only when said second light permeable portion is positioned in said light passage of said second light emitting means.

3. A punch press as set forth in claim 2, wherein each of said first and second light emitting means includes a light emitting diode and each of said first and second light responsive means includes a phototransistor.

4. A punch press as set forth in claim 1, further comprising:

first measuring means for measuring an angular displacement of said punch holder;

second measuring means for measuring a degree of angular displacement of said die holder;

means coupled to said first and second measuring means and adapted to produce a credit signal when the measured angular displacements of said punch and die holders are the same; and means supplied with said credit signal and said punch instruction signal from said control unit and adapted to send said punch instruction signal to said punch drive means only when said credit signal is received.

5. A punch press as set forth in claim 4, wherein said first detection means comprises:

a first disc rotatable in synchronism with said punch holder;

a pair of first light emitting and light responsive means located opposingly on opposite sides of said first disc such that light emitted by said first light emitting means is projected toward said first light responsive means; and a first light permeable portion formed in said first disc at a position crossing the light passage of said first light emitting means during rotation of said first disc, said first light responsive means being adapted for receiving light emitted from said first light emitting means and producing said first detection signal only when said first light permeable portion is positioned in said light passage of said first light emitting means;

said second detection means comprises:

a second disc rotatable in synchronism with said die holder;

a pair of second light emitting and light responsive means located opposingly on opposite sides of said second disc such that light emitted by said second light emitting means is projected toward said second light responsive means; and a second light permeable position formed in said second disc at a position crossing the light passage of said second light emitting means during rotation of said second disc, said second light responsive means being adapted for receiving light emitted from said second light emitting means and producing said second detection signal only when said second light permeable portion is positioned in said light passage of said second light emitting means;

said first measuring means comprises:

a pair of third light emitting and light responsive means located opposingly on opposite sides of said first disc such that light emitted from said third light emitting means is projected toward said third light responsive means;

a multiplicity of angularly equally spaced third light permeable portions formed in said first disc and passable across the light passage of said third light emitting means by rotation of said first disc, said third light responsive means receiving light from said third light emitting means when each one of said third light permeable portions passes across said light passage of said third light emitting means, thereby producing first pulses in a number proportional to the number of the passed light permeable portions; and a first counter for counting the number of said first pulses;

said second measuring means comprises:

a pair of fourth light emitting and light responsive means located opposingly on opposite sides of said second disc such that light emitted from said fourth light emitting means is projected toward said fourth light responsive means;

a multiplicity of fourth angularly equally light permeable portions formed in said second disc and passable across the light passage of said fourth light emitting means by rotation of said second disc, said fourth light responsive means receiving light from said fourth light emitting means when each one of said fourth light permeable portions passes across said light passage of said fourth light emitting means, thereby producing second pulses in a number proportional to the number of passed fourth light permeable portions; and a second counter for counting the number of said second pulses; and said means for producing a credit signal is a comparator coupled to said first and second counters and adapted to produce said credit signal when the numbers of said first and second pulses are equal.

6. A punch press as set forth in claim 5, wherein each of said first to fourth light emitting means includes a light emitting diode and each of said first to fourth light responsive means includes a phototransistor.

7. A punch press as set forth in claim 1 or 4, wherein said punch and die holders driving means includes a sprocket and chain rotary drive operatively connected to said punch and die holders, and a motor for driving said sprocket and chain rotary drive so that said punch and die holders are simultaneously rotated from said motor.

8. A punch press as set forth in claim 1 or 4, wherein said punch and die holders driving means includes two separate motors for independently driving said punch and die holders, respectively.

9. A punch press, comprising:
a base member;
a pair of vertically spaced apart upper and lower plates secured to said base member;
a punch holder rotatably mounted on said upper plate for supporting a punch;
a die holder rotatably mounted on said lower plate for supporting a die;
drive means for rotating said punch holder and said die holder;
means for positioning a workpiece in the X axis and Y axis;
first means for measuring the angular displacement of said punch holder;
second means for measuring the angular displacement of said die holder;
means coupled to said first and second measuring means and adapted to generate a credit signal when the measured angular displacements of said punch and die holders are the same;
a source of a punch command signal;
means supplied with said credit signal and said punch command signal and adapted to output a punch instruction signal only when said credit signal is received; and
means, coupled to said punch instruction signal output means, for driving said punch relative to said die upon receipt of the punch instruction signal.

10. A punch press as set forth in claim 9, wherein said first means for measuring a degree of the angular displacement of said punch holder comprises:
a first disc rotatable in synchronism with said punch holder;
a pair of first light emitting and light responsive means located opposingly on opposite sides of said first disc such that light emitted from said first light emitting means is projected toward said first light responsive means;
a multiplicity of angularly equally spaced first light permeable portions formed in said first disc and passable across the light passage of said first light emitting means by rotation of said first disc, said first light responsive means receiving light from said first light emitting means when each one of said first light permeable portions passes across said light passage of said first light emitting means, thereby producing first pulses in a number proportional to the number of the passed first light permeable portions; and
a first counter for counting the number of said first pulses;
said second means for measuring a degree of the angular displacement of said die holder comprises:
a second disc rotatable in synchronism with said die holder;
a pair of second light emitting and light responsive means located opposingly on opposite sides of said second disc such that light emitted from said second light emitting means is projected toward said second light responsive means;
a multiplicity of second angularly equally spaced light permeable portions formed in said second disc and passable across the light passage of said second light emitting means by rotation of said second disc, said second light responsive means receiving light from said second light emitting means when each one of said second light permeable portions passes across said light passage of said second light emitting means, thereby producing second pulses in a number proportional to the number of passed second light permeable portions; and
a second counter for counting the number of said second pulses; and
said means for generating the credit signal is a comparator coupled to said first and second counters and adapted to produce said credit signal when the numbers of said first and second pulses are equal.

11. A punch press as set forth in claim 10, wherein each of said first and second light emitting means includes a light emitting diode and each of said first and second light responsive means includes a phototransistor.

12. A punch press as set forth in claim 9, wherein said punch and die holders driving means includes a sprocket and chain rotary drive operatively connected to said punch and die holders, and a motor for driving said sprocket and chain rotary drive so that said punch and die holders are simultaneously rotated from said motor.

13. A punch press as set forth in claim 9, wherein said punch and die holders driving means includes two separate motors independently driving said punch and die holders, respectively.

14. A punch press, comprising:
a base member;
a pair of vertically spaced apart upper and lower turrets rotatably secured to said base member;
a plurality of punch holders rotatably mounted on said upper turret in circumferentially spaced positions thereof, each punch holder holding a punch and having a first check point at a fixed position thereof so that said first check point draws a predetermined first locus by rotation of said punch holder;
die holders corresponding in number to the number of said punch holders and rotatably mounted on said lower turret in circumferentially spaced positions thereof, each die holder supporting a die which corresponds to respective one of said punches and having a second check point at a fixed position thereof so that said second check point draws a predetermined second locus by rotation of said die holder;
means for rotating said upper and lower turrets to position selected one of said punches and its corresponding die at a predetermined punching location;

first driven friction disc members operatively connected to respective punch holders and rotatably supported on said upper turret;
second driven friction disc members operatively connected to respective die holders and rotatably supported on said lower turret;
a first common drive friction disc member rotatably mounted on said base member and forming a first clutch with selected one of said first driven friction disc members when its connected punch holder is positioned at said punching location;
a second common drive friction disc member rotatably mounted on said base member and forming a second clutch with selected one of said second driven friction disc members when its connected die holder is positioned at said punching location;
driving means for rotating said first and second common drive friction disc members;
first means for actuating said first clutch so that said first common drive friction disc member is engaged with said selected first driven friction disc member for rotation therewith;
second means for actuating said second clutch so that said first common drive friction disc member is engaged with said selected second driven friction disc member for rotation therewith;
first detection means adapted to produce a first detection signal when said first check point of said selected punch holder is positioned at a predetermined first location on said first locus;
second detection means adapted to produce a second detection signal when said second check point of said selected die holder is positioned at a predetermined second location on said second locus;
said punch and die of said selected punch and die holders being cooperable with each other to machine a workpiece interposed therebetween when said first and second check points are positioned respectively at said first and second locations or when an angular displacement of said first check point from said first location is the same as that of said second check point from said second location;
means for positioning the workpiece in the X axis and Y axis;
means supplied with said first and second detection signals and adapted to produce a start signal upon receipt of both of said first and second detection signals;
a control unit adapted to start operation upon receipt of said start signal and to generate a punch instruction signal; and
means for actuating said selected punch relative to said selected die upon receipt of said punch instruction signal, whereby to machine the workpiece.

15. A punch press as set forth in claim 14, wherein said first detection means comprises:
a first disc rotatable in synchronism with said selected punch holder;
a pair of first light emitting means and first light responsive means located opposingly on opposite sides of said first disc such that light emitted from said first light emitting means is projected toward said first light responsive means; and
a first light permeable portion formed in said first disc at a position crossing the light passage of said first light emitting means during rotation of said first disc, said first light responsive means being adapted for receiving light emitted from said first light emitting means and producing said first detection signal only when said first light permeable portion is positioned in said light passage of said first light emitting means; and
said second detection means comprises:
a second disc rotatable in synchronism with said selected die holder;
a pair of second light emitting means and second light responsive means located opposingly on opposite sides of said second disc such that light emitted from said second light emitting means is projected toward said second light responsive means; and
a second light permeable portion formed in said second disc at a position crossing the light passage of said second emitting means during rotation of said second disc, said second light responsive means being adapted for receiving light emitted from said second light emitting means and producing said second detection signal only when said second light permeable portion is positioned in said light passage of said second light emitting means.

16. A punch press as set forth in claim 15, wherein each of said first and second light emitting means includes a light emitting diode and each of said first and second light responsive means includes a phototransistor.

17. A punch press as set forth in claim 14, further comprising:
first measuring means for measuring an angular displacement of said selected punch holder;
second measuring means for measuring an angular displacement of said selected die holder;
means coupled to said first and second measuring means and adapted to produce a credit signal when the measured angular displacements of said selected punch and die holders are the same; and
means supplied with said credit signal and said punch instruction signal from said control unit and adapted to send said punch instruction signal to said punch drive means only when said credit signal is received.

18. A punch press as set forth in claim 17, wherein said first detection means comprises:
a first disc rotatable in synchronism with said selected punch holder;
a pair of first light emitting and light responsive means located opposingly on opposite sides of said first disc such that light emitted by said first light emitting means is projected toward said first light responsive means; and
a first light permeable portion formed in said first disc at a position crossing the light passage of said first light emitting means during rotation of said first disc, said first light responsive means being adapted for receiving light emitted from said first light emitting means and producing said first detection signal only when said first light permeable portion is positioned in said light passage of said first light emitting means;
said second detection means comprises:
a second disc rotatable in synchronism with said selected die holder;
a pair of second light emitting and light responsive means located opposingly on opposite sides of said second disc such that light emitted by said second light emitting means is projected toward said second light responsive means; and a second light permeable position formed in said second disc at a position crossing the light passage of said second light emitting means during rotation of said second disc, said second light responsive means being adapted for receiving light emitted from said second light emitting means and producing said second detection signal only when said second light permeable portion is positioned in said light passage of said second light emitting means;

said first measuring means comprises:
a pair of third light emitting and light responsive means located opposingly on opposite sides of said first disc such that light emitted from said third light emitting means is projected toward said third light responsive means;
a multiplicity of angularly equally spaced third light permeable portions formed in said first disc and passable across the light passage of said third light emitting means by rotation of said first disc, said third light responsive means receiving light from said third light emitting means when each one of said third light permeable portions passes across said light passage of said third light emitting means, thereby producing first pulses in a number proportional to the number of the passed light permeable portions; and
a first counter for counting the number of said first pulses;

said second measuring means comprises:
a pair of fourth light emitting and light responsive means located opposingly on opposite sides of said second disc such that light emitted from said fourth light emitting means is projected toward said fourth light responsive means;
a multiplicity of fourth angularly equally spaced light permeable portions formed in said second disc and passable across the light passage of said fourth light emitting means by rotation of said second disc, said fourth light responsive means receiving light from said fourth light emitting means when each one of said fourth light permeable portions passes across said light passage of said fourth light emitting means, thereby producing second pulses in a number proportional to the number of passed fourth light permeable portions; and
a second counter for counting the number of said second pulses; and said means for producing a credit signal is a comparator coupled to said first and second counters and adapted to produce said credit signal when the numbers of said first and second pulses are equal.

19. A punch press as set forth in claim 18, wherein each of said first to fourth light emitting means includes a light emitting diode and each of said first to fourth light responsive means includes a phototransistor.

20. A punch press as set forth in claim 14 or 17, wherein said drive means for rotating said first and second common drive friction disc members comprises two separate motors mounted on said base member and having their drive shafts connected respectively to said first and second common drive friction disc members.

21. A punch press as set forth in claim 14 or 17, wherein said drive means for rotating said first and second common drive friction disc members comprises a sprocket and chain rotary drive operatively connected to said first and second common drive friction disc members, and a common motor for driving said sprocket and chain rotary drive so that said first and second common drive friction disc members are simultaneously rotated from said common motor.

22. A punch press, comprising:
a base member;
a pair of vertically spaced apart upper and lower turrets rotatably secured to said base member;
a plurality of punch holders rotatably mounted on said upper turret in circumferentially spaced positions thereof, each punch holder holding a punch;
die holders corresponding in number to the number of said punch holders and rotatably mounted on said lower turret in circumferentially spaced positions thereof, each die holder supporting a die which corresponds to respective one of said punches;
means for rotating said upper and lower turrets to position selected one of said punches and its corresponding die at a predetermined punching location;
first driven friction disc members operatively connected to respective punch holders and rotatably supported on said upper turret;
second driven friction disc members operatively connected to respective die holders and rotatably supported on said lower turret;
a first common drive friction disc member rotatably mounted on said base member and forming a first clutch with selected one of said first driven friction disc members when its connected punch holder is positioned at said punching location;
a second common drive friction disc member rotatably mounted on said base member and forming a second clutch with selected one of said second driven friction disc members when its connected die holder is positioned at said punching location;
driving means for rotating said first and second common drive friction disc members;
first means for actuating said first clutch so that said first common drive friction disc member is engaged with said selected first driven friction disc member for rotation therewith;
second means for actuating said second clutch so that said first common drive friction disc member is engaged with said selected second driven friction disc member for rotation therewith;
means for positioning the workpiece in the X axis and Y axis;
first means for measuring the angular displacement of said selected punch holder;
second means for measuring the angular displacement of said selected die holder;
means coupled to said first and second measuring means and adapted to generate a credit signal when the measured angular displacements of said selected punch and die holders are the same;
a source of a punch command signal;
means supplied with said credit signal and said punch command signal and adapted to output a punch instruction signal only when said credit signal is received; and
means, coupled to said punch instruction signal output means, for driving said punch relative to said die upon receipt of the punch instruction signal.

23. A punch press as set forth in claim 22, wherein said first means for measuring the angular displacement of said selected punch holder comprises:
a first disc rotatable in synchronism with said selected punch holder;

a pair of first light emitting and light responsive means located opposingly on opposite sides of said first disc such that light emitted from said first light emitting means is projected toward said first light responsive means;

a multiplicity of angularly equally spaced first light permeable portions formed in said first disc and passable across the light passage of said first light emitting means by rotation of said first disc, said first light responsive means receiving light from said first light emitting means when each one of said first light permeable portions passes across said light passage of said first light emitting means, thereby producing first pulses in a number proportional to the number of the passed first light permeable portions; and a first counter for counting the number of said first pulses;

said second means for measuring the angular displacement of said selected die holder comprises:

a second disc rotatable in synchronism with said die holder;

a pair of second light emitting and light responsive means located opposingly on opposite sides of said second disc such that light emitted from said second light emitting means is projected toward said second light responsive means;

a multiplicity of second angularly equally spaced light permeable portions formed in such second disc and passable across the light passage of said second light emitting means by rotation of said second disc, said second light responsive means receiving light from said second light emitting means when each one of said second light permeable portions passes across said light passage of said second light emitting means, thereby producing second pulses in a number proportional to the number of passed second light permeable portions; and a second counter for counting the number of said second pulses; and said means for generating the credit signal is a comparator coupled to said first and second counters and adapted to produce said credit signal when the numbers of said first and second pulses are equal.

24. A punch press as set forth in claim 23, wherein each of said first and second light emitting means includes a light emitting diode and each of said first and second light responsive means includes a phototransistor.

25. A punch press as set forth in claim 22, wherein said drive means for rotating said first and second common drive friction disc members comprises two separate motors mounted on said base member and having their drive shafts connected respectively to said first and second common drive friction disc members.

26. A punch press as set forth in claim 22, wherein said drive means for rotating said first and second common drive friction disc members comprises a sprocket and chain rotary drive operatively connected to said first and second common drive friction disc members, and a common motor for driving said sprocket and chain rotary drive so that said first and second common drive friction disc members are simultaneously rotated from said common motor.

* * * * *

UNITED STATES PATENT AND TRADEMARK OFFICE
CERTIFICATE OF CORRECTION

PATENT NO. : 4,343,210
DATED : 10 August 1982
INVENTOR(S) : Kazuo Kuroyone

It is certified that error appears in the above—identified patent and that said Letters Patent is hereby corrected as shown below:

On the first page of the patent, the following should be inserted after "[76] Inventor:"

--[73] Assignee: Anritsu Denki Kabushiki Kaisha, Tokyo, Japan--

Signed and Sealed this

Twenty-sixth Day of August 1986

[SEAL]

Attest:

DONALD J. QUIGG

Attesting Officer

Commissioner of Patents and Trademarks